June 23, 1936.  R. A. GOEPFRICH  2,045,010
BRAKE
Filed Dec. 1, 1932
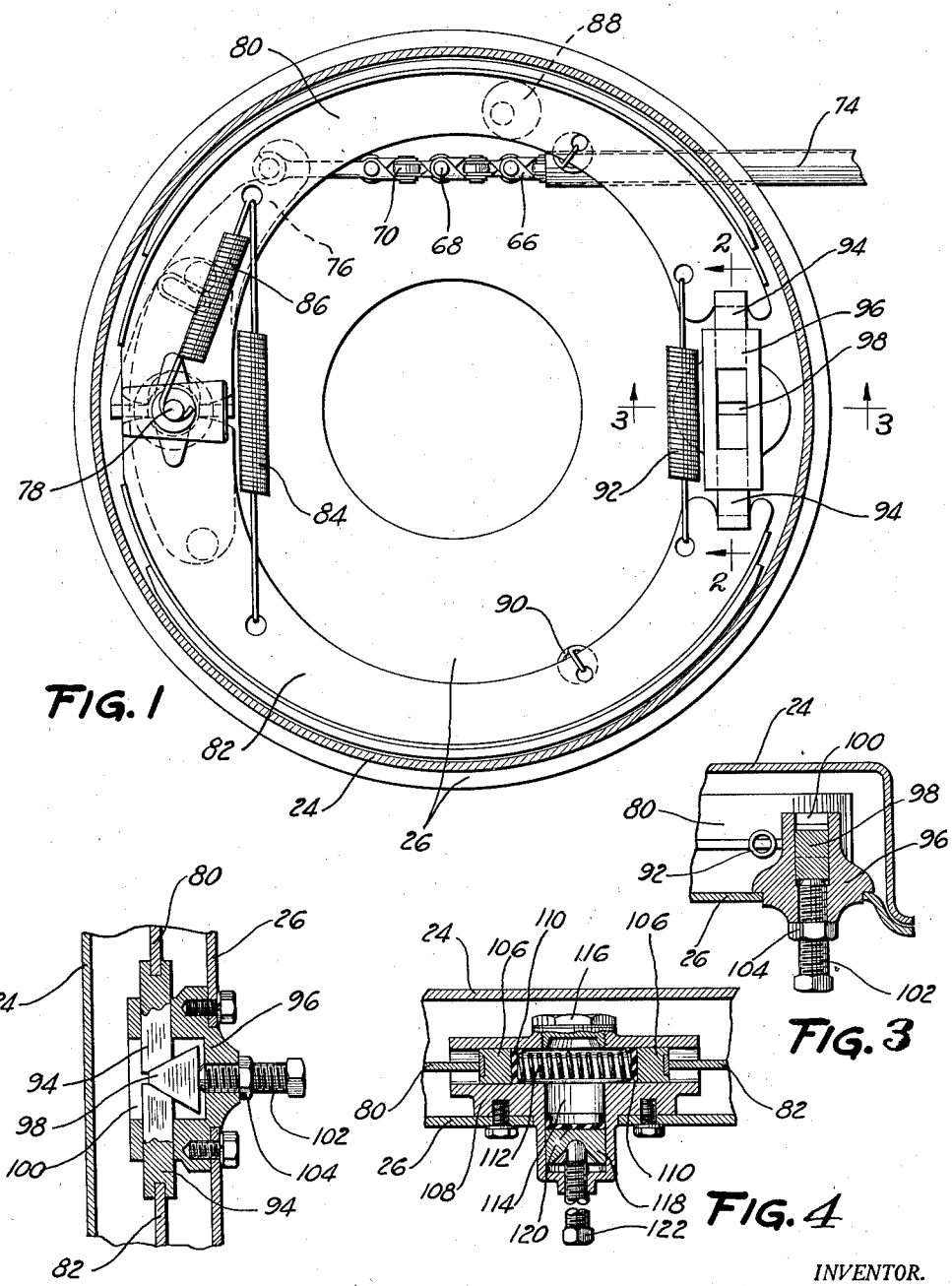
INVENTOR.
RUDOLPH A. GOEPFRICH
BY
*Jn. W. McConkey*
ATTORNEY.

Patented June 23, 1936

2,045,010

UNITED STATES PATENT OFFICE 2,045,010

BRAKE

Rudolph A. Goepfrich, South Bend, Ind., assignor to Bendix Aviation Corporation, South Bend, Ind., a corporation of Delaware Application December 1, 1932, Serial No. 645,307

11 Claims. (Cl. 188—79.5)

This invention relates to brakes, and is illustrated as embodied in a four-wheel automotive brake system including brakes of the internal expanding shiftable-anchorage type.

An important object of the invention is to simplify the adjustment of brakes of this type, by providing the floating joint between the shoes (or its equivalent) with an adjusting means which operates it without floating with it, and which consequently is adapted for operation from outside the brake. In one arrangement, the joint includes aligned thrust plungers slidably arranged in a stationary guide and engaging the respective shoes and shiftable as a unit with the shoe ends and with the novel adjustment to permit the anchoring of one or the other of the shoes, and which plungers are separated more or less to adjust the brake for wear by a novel floating adjustment or thrust medium, such as a floating wedge or a column of liquid, which is readily operable to make the adjustment but which does not interfere with the above-described unit shifting. Other features of the invention relate to the means for operating the wedge, or forcing additional liquid into the liquid thrust column, in the manner described.

Other objects and features of the invention, including certain novel features of the actuating mechanism, will be apparent from the following description of the illustrative embodiment shown in the accompanying drawing, in which:

Figure 1 is a vertical section through the left front brake, just inside the head of the brake drum, and with the brake shoes shown in side elevation;

Figure 2 is a partial section through the novel brake adjustment, on the line 2—2 of Figure 1;

Figure 3 is a partial section through the adjustment on the line 3—3 of Figure 1; and Figure 4 is a section corresponding to Figure 5, but showing an alternative form of adjustment.

In the illustrated brake the actuating means within the brake may be operatively connected to a flexible tension element shown as made up of links 66 connected by pivot pins 68 carrying rollers 70 arranged alternately at right angles to each other. This element is slidably housed in a conduit 74 secured at one end to the chassis frame and at its forward end to the backing plate 26 of the front brake, inside of the brake.

The tension element is connected, inside the brake, to a floating brake-applying lever 76 arranged in the space between the brake backing plate and the web of the upper brake shoe, and having thrust lugs on opposite sides of the fixed anchor post or brake anchorage 78. Rocking the floating lever 76 rearwardly spreads apart two floating brake shoes 80 and 82, between the adjacent ends of which the anchorage 78 is formed.

A return spring 84 urges the shoes toward the anchor 78, and an auxiliary spring 86 holds the upper or secondary shoe continuously against the anchor except when the drum friction shifts the anchorage to the shoe 82. Suitable eccentric stops or the like 88 and spring steady rests or the like 90 may, if desired, be provided in the usual manner.

A third spring 92 may be provided, to hold the shoes 80 and 82 continuously against lengthwise-movable plungers 94, shown slotted to embrace the ends of the shoe webs. Plungers 94 are slidably arranged, in alignment with each other, in the end guide portions of a guide member 96 rigidly fastened to the backing plate 26.

The adjacent ends of the plungers are beveled, to receive between them a floating adjusting wedge 98 which is arranged in a central enlarged space 100 in the guide member 96, and which can shift freely circumferentially of the brake as a unit with the plungers 94, to permit either shoe 80 or 82 to anchor.

Wedge 98 is operated, to adjust the brake for wear, by means such as a threaded adjusting screw 102 which disconnectedly engages the base of the wedge, and which can be turned from outside the brake by a suitable wrench, to shift it lengthwise in a direction transverse to the direction of movement of the plungers 94, to cause it to operate the wedge 98 to separate the plungers 94 more or less to adjust the brake for wear, without at all interfering with the freedom of movement of the wedge 98 and the plungers 94 as a shoe-connecting unit.

A check-nut 104 may be threaded on the operating member 102 if desired.

In the arrangement of Figure 7, the plungers are in the form of pistons 106 engaged by the shoes 80 and 82 and arranged in aligned cylinders formed in the ends of a guide member 108 rigidly mounted on the backing plate 26. The pistons are shown provided with rubber sealing cups or packings 110 held by a light spring 112.

The pistons are separated by a liquid column, of mineral oil or a mixture of castor oil and alcohol or the like, communicating with a central reservoir space 114 closed on one side (inside the brake) by a filler cap 116 and formed as a transverse cylinder receiving an adjustment piston 118 faced with a rubber cup or packing 120 and backed up by a threaded adjusting screw or the like 122 corresponding in function to the screw 102.

Tightening up on screw 122 forces more liquid into the column between the plungers 106, separating the plungers more or less to adjust for wear of the brake.

While one illustrative embodiment has been described in detail, it is not my intention to limit the scope of the invention to that particular embodiment, or otherwise than by the terms of the appended claims.

I claim:

1. A brake comprising a pair of shoes having anchorage means at their adjacent ends at one side of the brake, and having shiftable connecting means for the ends at the other side of the brake including a stationary tubular guide between said other ends, shiftable plungers in the opposite ends of the guide and engaging the ends of the respective shoes, a thrust medium between said plungers in the guide and shiftable in the guide as a unit with said plungers to permit different movement of the shoe ends engaged thereby as one or the other of the shoes anchors when the brake is applied, and means operable transversely of the line of movement of the plungers and acting on said medium to separate the plungers more or less without interfering with the movement of the plungers and said medium, to compensate for wear of the brake.

2. A brake comprising a pair of shoes having anchorage means at their adjacent ends at one side of the brake, and having shiftable connecting means for the ends at the other side of the brake including a stationary tubular guide between said other ends, shiftable plungers in the opposite ends of the guide and engaging the ends of the respective shoes, a substantially incompressible thrust medium between said plungers in the guide and shiftable in the guide as a unit with said plungers to permit different movement of the shoe ends engaged thereby as one or the other of the shoes anchors when the brake is applied, and means disconnectedly acting on said medium and operable transversely of the line of movement of the plungers and acting on said medium to separate the plungers more or less without interfering with the movement of the plungers and said medium, to compensate for wear of the brake.

3. A brake comprising a pair of shoes having anchorage means at their adjacent ends at one side of the brake, and having shiftable connecting means for the ends at the other side of the brake including a stationary guide between said other ends, shiftable plungers in the opposite ends of the guide and engaging the ends of the respective shoes, a wedge between said plungers and shiftable with said plungers as a unit circumferentially of the brake to permit the anchoring of one or the other of said shoes, and a part disconnectedly engaging the wedge in a manner not interfering with its circumferential movement and operable transversely of said circumferential movement to operate the wedge to force the plungers apart more or less to compensate for wear of the shoes.

4. A brake comprising a pair of shoes having anchorage means at their adjacent ends at one side of the brake, and having shiftable connecting means for the ends at the other side of the brake including a stationary tubular guide between said other ends, shiftable plungers in the opposite ends of the guide and engaging the ends of the respective shoes, a liquid column in the tubular guide between said plungers and shiftable with said plungers as a unit circumferentially of the brake to permit the anchoring of one or the other of said shoes, and means for forcing additional liquid into said column in a manner not interfering with its circumferential movement to force the plungers apart more or less to compensate for wear of the shoes.

5. A connecting device for brake shoes or the like comprising a guide having aligned tubular ends with an enlarged space between them, thrust plungers arranged in said ends and freely movable lengthwise therein, a floating wedge arranged in said space between the adjacent ends of the plungers and freely shiftable as a unit with the plungers in their lengthwise movement, and means with respect to which the wedge is freely shiftable crosswise and which is arranged for operating the wedge to separate the plungers more or less without interfering with movement of the wedge and plungers as a unit.

6. A connecting device for brake shoes or the like comprising a guide having aligned tubular ends with an enlarged space between them, thrust plungers arranged in said ends and freely movable lengthwise therein, a floating medium arranged in said space between the adjacent ends of the plungers and freely shiftable as a unit with the plungers in their lengthwise movement, and means for operating said medium to separate the plungers more or less without interfering with movement of said medium and plungers as a unit, said medium being freely shiftable relatively to and crosswise of said means, and said means normally being stationary during the shifting of said plungers and said medium.

7. A connecting device for brake shoes or the like comprising a guide having aligned tubular ends with an enlarged space between them, thrust plungers arranged in said ends and freely movable lengthwise therein, a floating wedge arranged in said space between the adjacent ends of the plungers and freely shiftable as a unit with the plungers in their lengthwise movement, a fixed bearing extending transversely of the line of movement of the plungers in line with the base of the wedge, and a part adjustable in said bearing to operate the wedge to separate the plungers and across which the wedge can shift freely.

8. A connecting device for brake shoes or the like comprising a guide having aligned tubular ends with an enlarged space between them, thrust plungers arranged in said ends and freely movable lengthwise therein, a floating wedge arranged in said space between the adjacent ends of the plungers and freely shiftable as a unit with the plungers in their lengthwise movement, a fixed bearing extending transversely of the line of movement of the plungers in line with the base of the wedge, and a part threaded into said bearing to operate the wedge to separate the plungers and across which the wedge can shift freely.

9. A connecting device for brake shoes or the like comprising a guide having aligned tubular ends with a central reservoir space therebetween, thrust plungers slidably arranged in said ends, a liquid filling said reservoir space and the space between the adjacent ends of the plungers, the portion of the liquid between the plungers being shiftable with the plungers as a unit, and means acting on the liquid in the reservoir space to force additional liquid into the space between the plungers to force them apart to compensate for wear of the shoes.

10. A connecting device for brake shoes or the like comprising a guide having aligned tubular ends with a central reservoir space therebetween, thrust plungers slidably arranged in said ends, a liquid filling said reservoir space and the space between the adjacent ends of the plungers, the portion of the liquid between the plungers being shiftable with the plungers as a unit, and an adjustable piston acting on the liquid in the reservoir space to force additional liquid into the space between the plungers to force them apart to compensate for wear of the shoes.

11. A connecting device for brake shoes or the like comprising a guide having aligned tubular ends with a central reservoir space therebetween, thrust plungers slidably arranged in said ends, a liquid filling said reservoir space and the space between the adjacent ends of the plungers, the portion of the liquid between the plungers being shiftable with the plungers as a unit, and an adjustable piston acting on the liquid in the reservoir space to force additional liquid into the space between the plungers to force them apart to compensate for wear of the shoes, together with a threaded stem operable transversely of the line of movement of the plungers and arranged to actuate the piston.

RUDOLPH A. GOEPFRICH.